United States Patent

[11] 3,551,730

| [72] | Inventor | Brian Keith Conrad |
| | | 1307 Capulet Court, McLean, Va. 22101 |
| [21] | Appl. No. | 805,341 |
| [22] | Filed | Mar. 7, 1969 |
| [45] | Patented | Dec. 29, 1970 |

[54] METHOD OF ALIGNING A SCAN PATTERN WITH A SURFACE PATTERN
16 Claims, 19 Drawing Figs.

| [52] | U.S. Cl. | 315/10, 315/12, 315/18, 315/23 |
| [51] | Int. Cl. | H01j 29/72 |
| [50] | Field of Search | 315/10, 12, 23, 18; 340/146.3 |

[56] References Cited
UNITED STATES PATENTS

| 3,337,766 | 8/1967 | Malaby | 315/18 |
| 2,816,246 | 12/1957 | Bliss | 315/10 |

Primary Examiner—Rodney D. Bennett, Jr.
Assistant Examiner—T.H. Tubbesing
Attorney—John R. Utermohle ABSTRACT: Method of aligning a scan pattern with a surface pattern. A deflectable beam is swept to form the desired scan pattern. The beam is swept across incremental segments of an alignment pattern to obtain lateral and angular displacement correction information indicative of a lack of coincidence condition of the scan and surface patterns. This pattern coincidence error recognition information is processed and applied to a set of deflection plates to correct the scan pattern configuration and orientation to make it coincident with the surface pattern.

PATENTED DEC 29 1970

INVENTOR
BRIAN KEITH CONRAD

BY

ATTORNEY

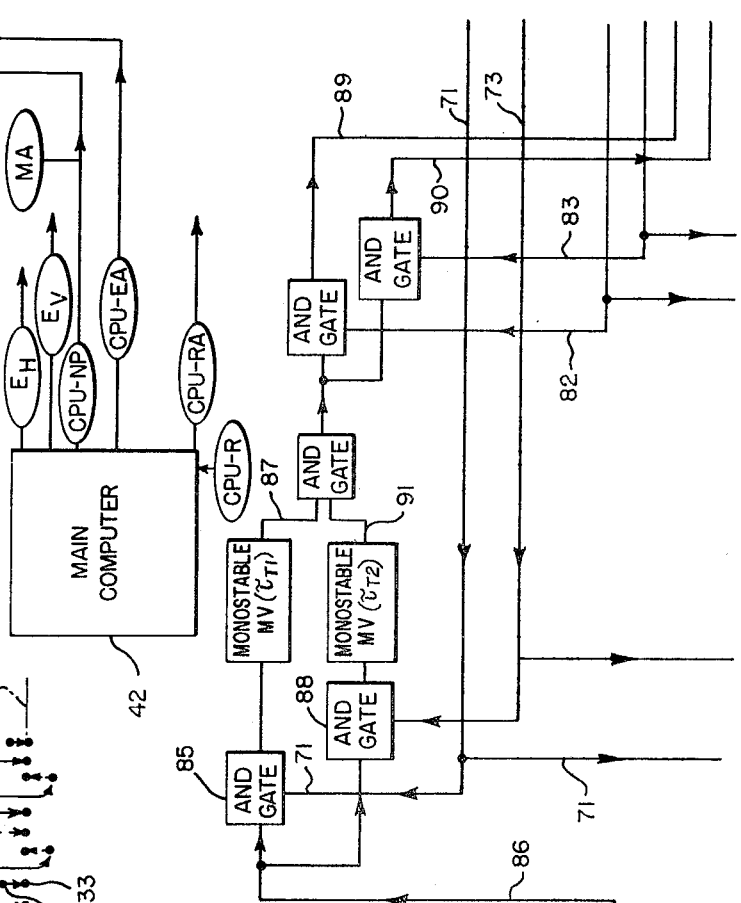
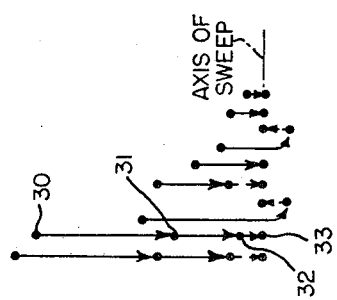
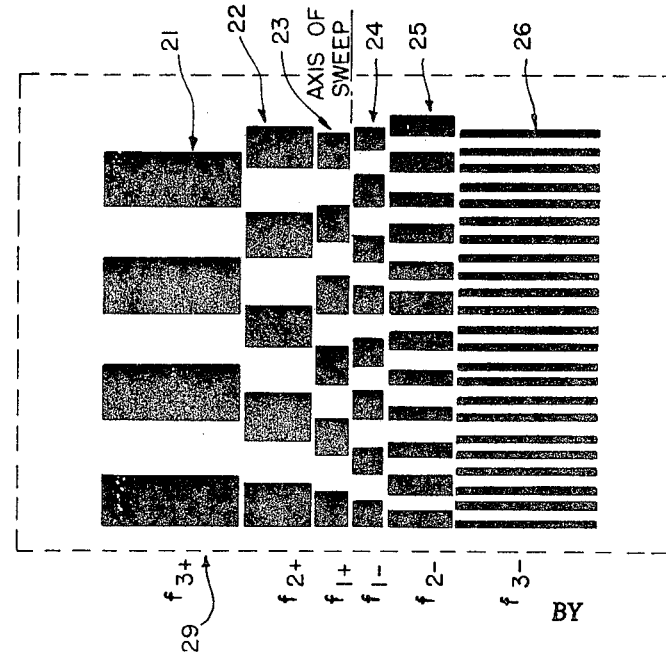
Fig. 8.
Fig. 7.
Fig. 3B.
Fig. 3A.
INVENTOR
BRIAN KEITH CONRAD
BY
ATTORNEY

INVENTOR
BRIAN KEITH CONRAD

BY

ATTORNEY

INVENTOR
BRIAN KEITH CONRAD
BY
ATTORNEY

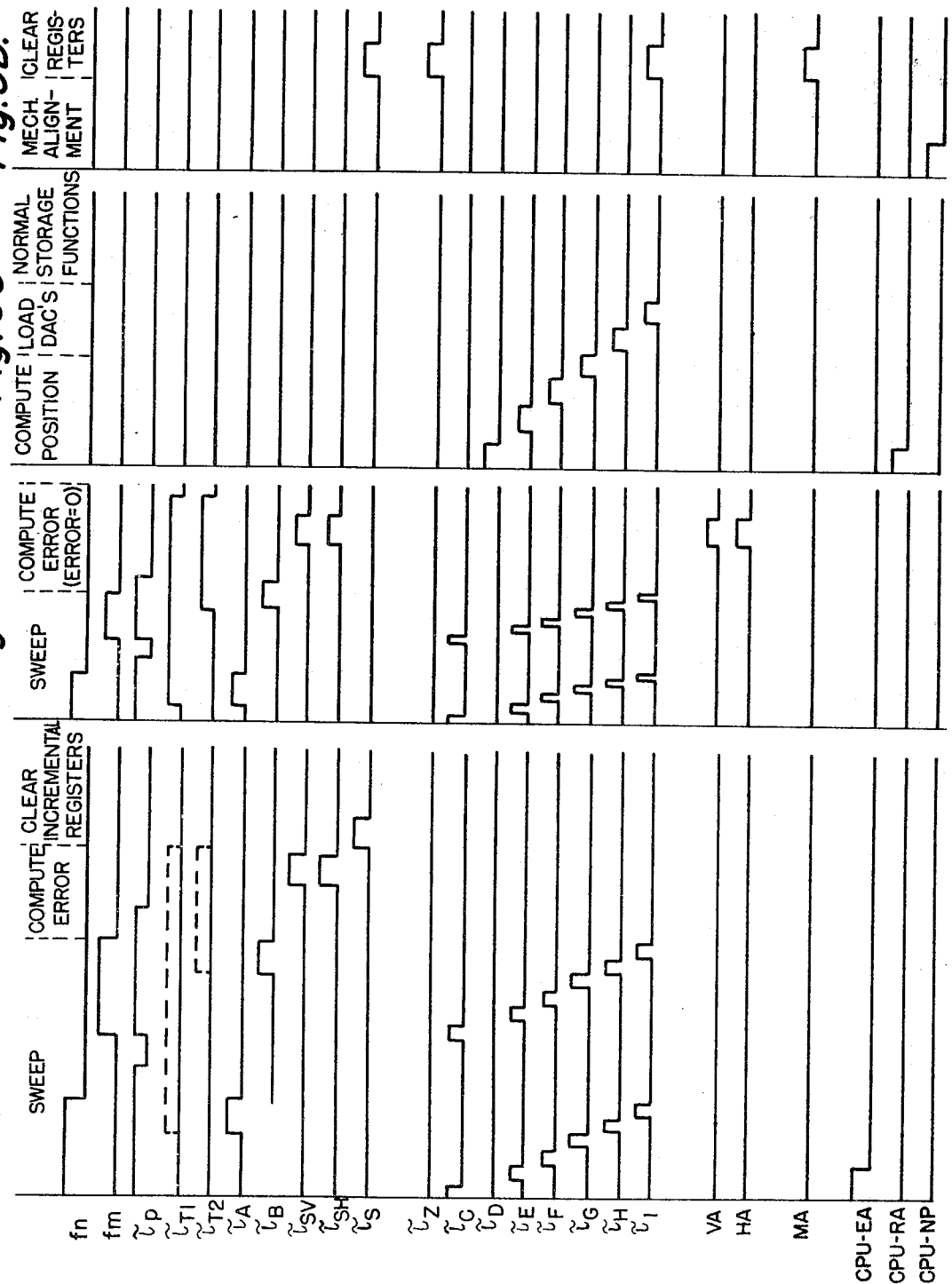

METHOD OF ALIGNING A SCAN PATTERN WITH A SURFACE PATTERN

FIELD OF THE INVENTION

The present invention is an alignment scheme; more particularly it is a method of aligning a scan pattern with a surface pattern.

PRIOR ART

Prior art devices concerned with pattern alignment do not compensate for the occurrence of angular displacement, such as caused by skew or rotation of the pattern to be aligned with respect to the pattern with which it is aligned. These prior art devices merely compensate for lateral displacement of the respective patterns. Prior art devices which correct for beam displacement rather than pattern displacement, must correct the beam on a point-to-point basis, as opposed to compensating for misalignment of the entire scan pattern "en masse." Some prior art devices also consider the problem of pattern size coincidence; however, these devices are not concerned with angular coincidence. Some prior art devices, such as one which compares the information obtained from impinging a deflectable beam on a code pattern in order to compare the result with a known value to correct for vertical error, must alter the original beam before it is passed to information targets, thus requiring a flat beam in order for the system to function. If the beam is skewed or rotated in such a system, it will not function. In systems where a point-to-point monitoring of the beam sweep is utilized, instead of scan pattern correction, there is a discernible delay, not tolerable in the case of high-speed electron beam addressed memory systems, due to the necessary constant point-to-point beam position verification by a monitoring device.

Prior art systems which are concerned with angular orientation of one body with respect to a standard reference body, such as disclosed in U.S. Pat. No. 3,388,266 which issued to Theo Stutz on June 11, 1968, are concerned with measurement of the angular orientation as opposed to correction for it. When the two bodies are in an angular relation to each other, there is a photoelectric indication of the degree of angular relation; however, there is no means disclosed for correcting for this lack of coincidence. This system is only capable of measuring rotational misalignment, and not skew misalignment, due to the fact that two nondeformable physical bodies, rather than a deformable scan pattern, are being oriented with respect to each other. There are no known prior art devices which can compensate for both lateral and angular displacement of a scan pattern with respect to a surface pattern so as to make the scan pattern coincident with the surface pattern, and it is apparent that in high speed, microscopic utilizations of swept beams, scan pattern alignment, rather than point-to-point beam position alignment, will result in a considerable decrease in correction delay time.

SUMMARY OF THE INVENTION

It is an object of the present invention to provide a new and improved method of aligning a scan pattern with a surface pattern.

It is another object of the present invention to provide a new and improved method of aligning a scan pattern with a surface pattern which overcomes the disadvantages of the prior art.

It is another object of the present invention to provide a new and improved method of aligning a scan pattern with a surface pattern wherein lateral and angular displacement of the scan pattern with respect to the surface pattern are corrected so as to make the scan pattern coincident with the surface pattern.

With these objects in view, a method of aligning a scan pattern with a surface pattern may include the steps of forming a scan pattern and correcting for lateral and angular displacement of the scan pattern with respect to the surface pattern so as to make the scan pattern coincident with the surface pattern.

Other objects and many of the intended advantages of this invention will be readily appreciated as the invention becomes better understood by reference to the following description when taken in conjunction with the following drawings wherein:

FIG. 3A is a typical alignment pattern by which the method of the present invention may be performed;

FIG. 3B is a diagram of various alignment positions of a beam when the alignment pattern shown in FIG. 3A is utilized;

Figure 10:
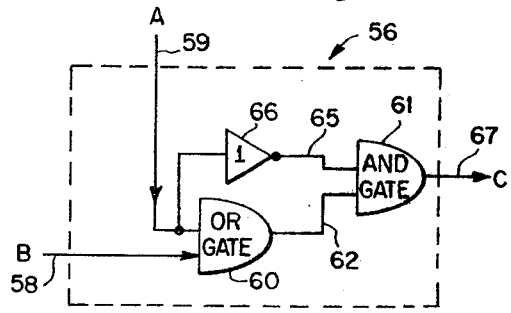
Figure 4:
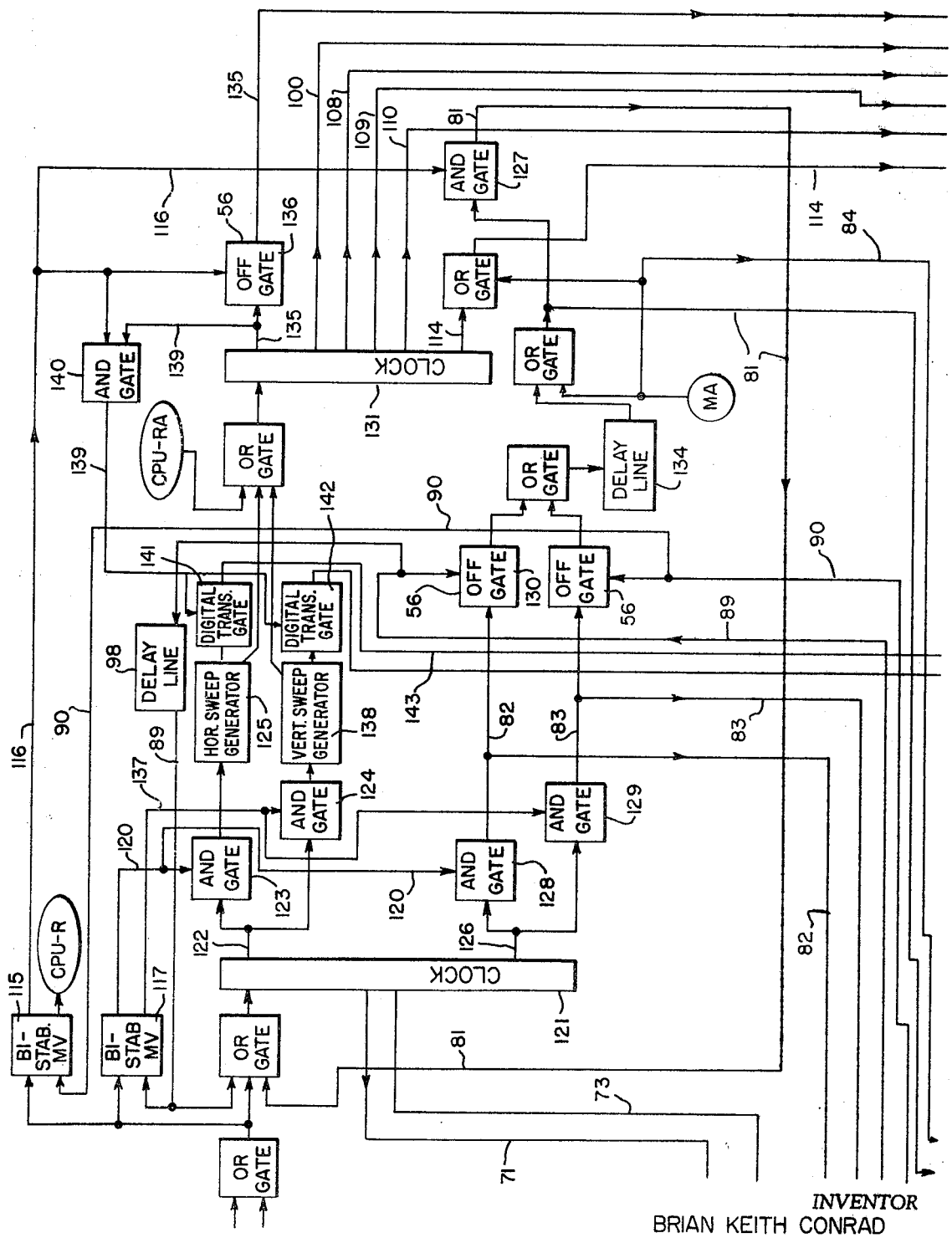
Figure 5A:
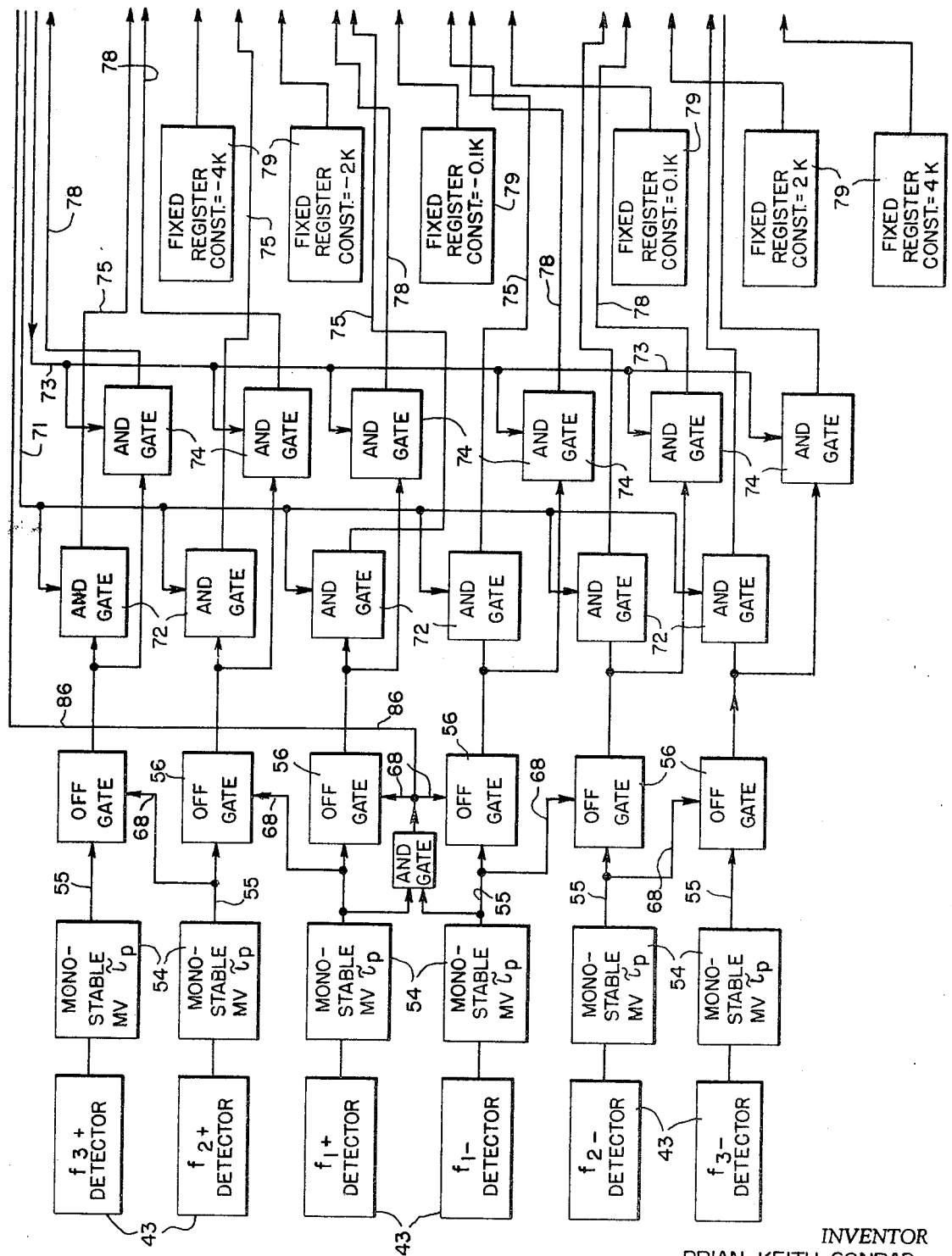
Figure 5B:
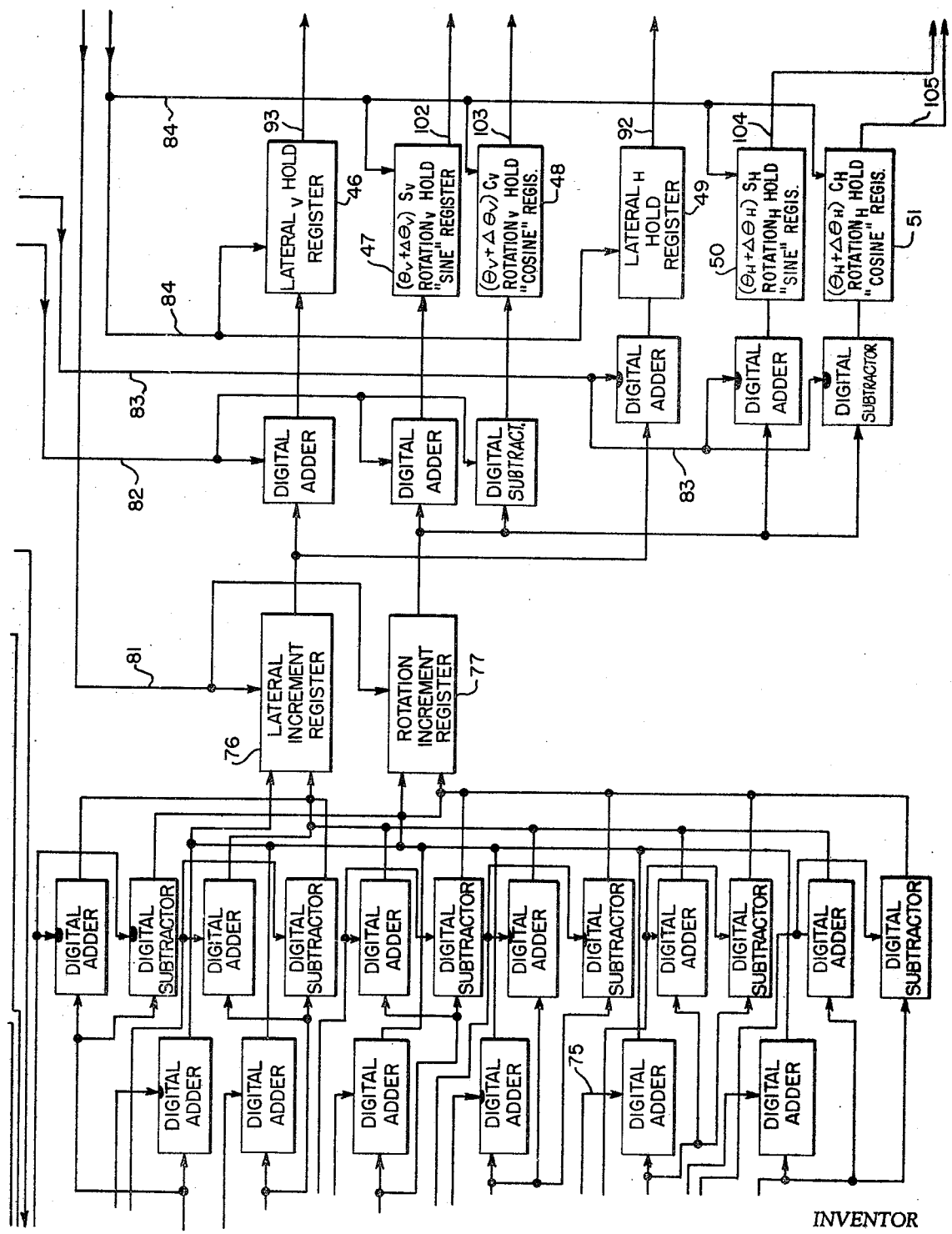

FIGS. 4 through 7, when assembled in the manner shown in FIG. 8, form a block diagram of an apparatus by which the method of the present invention may be performed;

FIGS. 9A, 9B, 9C and 9D are graphic representations of the time relationships present in the apparatus shown in FIGS. 4 through 7, when assembled in the manner shown in FIG. 8, and FIG. 10 is a more detailed block diagram of a component shown in block form in FIGS. 4, 5A, and 5B.

THEORY

Referring now to FIGS. 1A, 1B, 1C, 1D, and 1E, various alignment conditions of a scan pattern 15, shown by dashed lines, with respect to a surface pattern 16, shown by solid lines, are shown. For purposes of illustration, the desired surface pattern 16 is shown as a square. Thus, it can readily be seen that in order to make the scan pattern 15 coincident with the surface pattern 16, the scan pattern 15 must be in the shape of the square surface pattern 16, and have the same angular and lateral orientation that the surface pattern 16 has with respect to a set of deflection plates 17. For purposes of illustration, the set of deflection plates 17 consists of two opposite pairs of parallel deflection plates which form a square set at an angle $\theta_v$ with respect to the x-axis, defined as the x-axis of the surface pattern 16. The scan pattern 15 could be created in any known manner; however, for purposes of illustration it will be assumed that the scan pattern 15 is formed by sweeping a deflectable beam, such as an electron beam within the field formed by the set of deflection plates 17. The deflectable beam impinges upon the surface pattern 16.

Figure 1A:
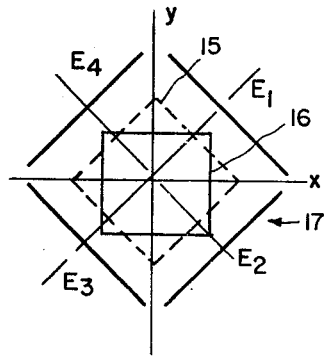
FIGS. 1A through 1E show various alignment conditions of the scan pattern with respect to the surface pattern.
Figure 1B:
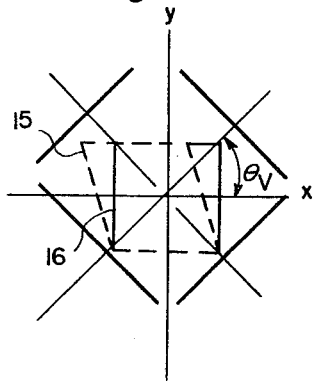
Figure 1C:
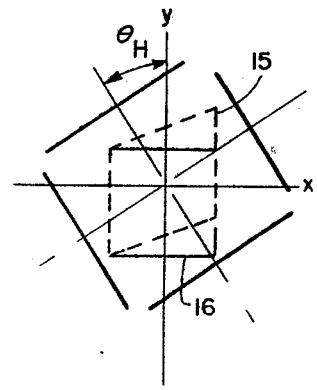
Figure 1D:
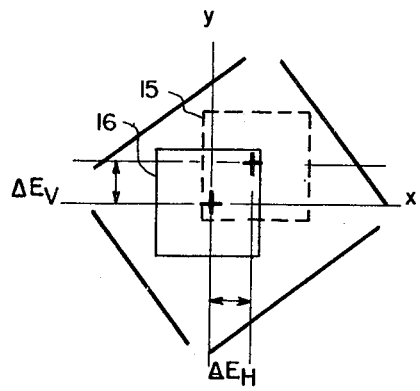
Figure 1E:
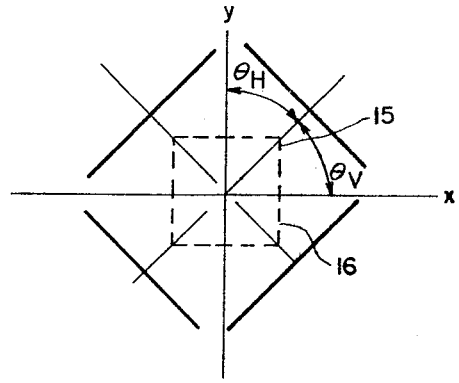

FIG. 1A shows the alignment condition when the only misalignment problem present is rotational; FIG. 1B shows the alignment condition when the only misalignment problem present is horizontal skew. FIG. 1C shows the alignment condition when the only misalignment problem present is vertical skew. FIG. 1D shows the alignment condition when the only misalignment problem present is that of lateral misalignment, the problem which is dealt with in the prior art. FIG. 1E shows the condition when both lateral and angular alignment, known as coincidence, exist.

In performing the method of the present invention, a scan pattern 15 is formed in any conventional manner, such as by sweeping an electron beam, or an ion beam, in the field formed by the set of deflection plates 17. By employing the method of the present invention, lateral and angular displacement of the scan pattern 15 with respect to the surface pattern 16 is corrected so as to make the scan pattern 15 coincident with the surface pattern 16. The method of the present invention is capable of correcting for the condition when both lateral and angular displacement simultaneously exist, although this alignment condition is not depicted in any of the FIGS.

The present invention is a method of electrically aligning a two dimensional surface pattern 16 with a two dimensional scan pattern 15 of a deflected beam incident upon a surface 20 upon which the surface pattern 16 appears. This may be accomplished by incorporating an alignment pattern 18 on to an otherwise unused portion of the surface pattern 16 lying in the path of the beam. This alignment pattern 18 is such that when the beam is swept at a uniform rate, or a constant average rate if desired, across the alignment pattern 18, an output signal is obtained which is made up of one or more frequencies as a function of the location and angular orientation of the path of the sweep. The frequency of the detected signal provides information on the direction and magnitude of lateral and angular correction that needs to be applied to the beam deflection plates 17 to produce coincidence.

Figure 2:
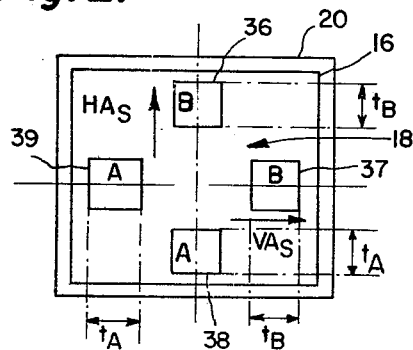
FIG. 2 is a diagram of a typical alignment sweep sequence.

When the alignment pattern 18 is swept by the beam, pattern coincidence error recognition information, which indicates the lateral and angular orientation of the scan pattern 15 with respect to the surface pattern 16 is obtained. In order to determine angular displacement as well as lateral displacement, the method of the present invention utilizes an alignment pattern 18, as shown in FIG. 2, composed of incremental segments, two being shown for the purposes of illustration, and designated A and B. Information obtained from each of the two incremental-segment sweeps $VA_s$ and $HA_s$ is combined to obtain the necessary lateral and angular correction information to produce coincidence of the scan 15 and surface patterns 16. The difference in the frequencies between segments provides information on the direction and magnitude of angular correction to be applied to the set of deflection plates 17 to produce angular coincidence of the scan 15 and surface patterns 16.

An alignment pattern 18 whose increments could comprise a pattern such as shown in FIG. 3A, is swept at a uniform rate by the deflectable beam, yielding an output signal which is made up of one or more frequencies, represented by the bands 21 through 26, shown in FIG. 3A, as a function of the location and angular orientation of the path of the sweep, as previously discussed. The frequency of the detected signal provides information on the direction and magnitude of lateral correction that needs to be applied to the plates 17 to produce coincidence, as was previously mentioned. This is accomplished by sweeping the beam across the alignment pattern bands 29. A desired on-axis condition is selected for the alignment pattern 18. If the beam is not in the on-axis position during the first sweep, subsequent sweeps are executed, with adjustments being made after each sweep, until the on-axis condition exists. If the alignment pattern 18 shown in FIG. 3A is used in performing the method of the present invention, a possible way of adjusting the lateral position of the scan pattern 15 is graphically illustrated in FIG. 3B. Assuming that an electrical potential is associated with each frequency band 29 of the alignment pattern 18, the associated potentials being integral multiples of each other if desired, and the fact that the circuitry utilized in performing the method of the present invention seeks the potential value associated with the frequency closest to the on-axis position, $f_1+(23)$ or $f_1-(24)$, for example, if an alignment pattern sweep results in the beam being on line between two frequency bands 29, then a possible adjustment pattern could be to adjust the lateral position of the scan pattern 15 in accordance with the relative heights of the frequency bands 29 with respect to each other, until the sweep is located in the region shown by the bands $f_1+(23)$ and $f_1-(24)$, assuming the on-axis position to be intermediate these two bands 23, 24, at which time a 10 percent correction factor is More particularly, if, for example, a sweep of the beam results in its initially being located in the position 30 one half unit down in the $f_3+$ band 21 which has a relative height of four units, the scan pattern 15 will be laterally adjusted four units down from this position 30, to a second position 31 one half unit down in the $f_2+$ band 22 which has a relative height of two units. The next successive sweep will result in a lateral adjustment down of the scan pattern 15 of two units placing it in a position 32 one half unit down in the $f_1+$ band 23, which has a relative height of one unit. At this time, since the beam is now located in the $f_1$ region the 10 percent correction factor will come into play, as was previously discussed. The reason for this is that, unless such an adjustment was made, the lateral position of the scan pattern 15 would oscillate back and forth around the on-axis position 33, going from a relative position, in the example given, of one half unit down on the $f_1+$ band 23 to one half unit down on the $f_1-$ band 24 then back to one half unit up on the $f_1+$ band 23 repetitively. Therefore, when the beam is located in the $f_1$ region, either the $f_1+$ 23 or the $f_1-$ band 24, from the position of initial location in that region, the lateral position of the scan pattern 15 is adjusted by one-tenth of a unit, in the example given, for each successive sweep, until the on-axis condition is indicated, at which time the sweep path is in the on-axis position 33.

If the sweep time interval is divided into two equal segments $t_A$, $t_B$, for the horizontal alignment, vertical sweep $HA_s$, and two equal segments $t_A$, $t_B$, for the vertical alignment horizontal sweep, $VA_s$, and each is analyzed separately, information will be obtained as to the direction and magnitude of angular correction required. If we place the same pattern in the four positions 36, 37, 38 and 39 indicated in FIG. 2, we can determine the necessary lateral and angular correction necessary for coincidence by executing the $x$-axis sweep $VA_s$ across the incremental segments 37, 39, located along the $x$-axis in order to obtain vertical lateral and angular pattern coincidence error recognition information, and then executing a sweep $HA_s$ along the $y$-axis, the configurations of the alignment patterns 36, 38 being identical with, but rotated 90° with respect to, the alignment pattern configurations 37, 39 along the $x$-axis, the $y$-axis sweep $HA_s$ being normal to the direction of the $x$-axis sweep $VA_s$, in order to obtain horizontal lateral and angular pattern coincidence error recognition information.

If we call the sweep intervals during which the incremental alignment patterns 36, 37, 38, 39, are being swept $t_A$ for the initial segment swept, and $t_B$ for the second segment swept, in both the $x$ and $y$ directions, and call the electrical potentials associated with the frequency bands 29 $f_{3A}+$, $f_{2A}+$, and $f_{1A}+$. $f_{1A}-$, $f_{2A}-$, and $f_{3A}-$; $-V_{3A}$, $-V_{2A}$, $-V_{1A}$, $+V_{1A}$, $+V_{2A}$, and $+V_{3A}$, respectively, and the electrical potentials associated with the frequency bands $f_{3B}+$, $F_{2B}+$, $f_{1B}+$, $f_{1B}-$, and $f_{2B}-$, $f_{3B}-$; $-V_{3B}$, $-V_{2B}$, $-V_{1B}$, $+V_{1B}$, $+V_{2B}$, and $+V_{3B}$, respectively, then a representative expression for the vertical alignment condition when the beam is swept along the $x$-axis $VA_s$ across segment A then segment B is $\Delta E_V = \Sigma[(V)_A + (V)_B]$ for lateral correction where $\Delta E_V$ is the vertical lateral displacement correction for pattern coincidence error; and $\Delta\theta_V = \Sigma[(V)_A - (V)_B]$ for angular correction, where $\Delta\theta_V$ is the vertical angular displacement correction for pattern coincidence error.

Representative expressions for the horizontal alignment condition, when the beam is swept along the $y$-axis segment $HA_s$, are $\Delta E_H = \Sigma[(V)_A + (V)_B]$ for lateral correction, where $\Delta E_H$ represents the horizontal lateral displacement correction for pattern coincidence error; and $\Delta\theta_H = \Sigma[(V)_A - (V)_B]$ for angular correction where $\Delta\theta_H$ represents the horizontal angular displacement correction for pattern coincidence error. These expressions are merely representative of the operations that are performed to derive the lateral and angular correction information.

In actual practice, in order to obtain the lateral displacement correction information, $\Delta E_V$ and $\Delta E_H$, the potential obtained during the first time interval, $t_A$, is added to the information obtained during the second time interval, $t_B$, to obtain a correction factor for this sweep, and this value is in turn summed with the summation of values obtained from the previous correctional sweeps of the beam, in order to obtain a new summation which represents the total lateral displacement correction information to be applied to the scan pattern beam sweep to compensate for the total lateral displacement existing up to, and including, this sweep. The expressions for the angular correction, $\Delta\theta_V$ and $\Delta\theta_H$, represent the operations necessary to correct for angular displacement. The potential obtained during the time interval $t_B$, is subtracted from the potential obtained during the initial segment sweep during the time period $t_A$ in order to obtain an angular displacement correction for that sweep. This value is then added to the summation of previously obtained subtraction resultants to obtain a new subtraction resultant summation representative of the total angular displacement correction for that sweep.

In order to correct for the lateral and angular displacement of the scan pattern 15 with respect to the surface pattern 16, a cumulative sinusoidal function of the lateral and angular displacement is applied to the set of deflection plates 17 to make the scan pattern 15 coincident with the surface pattern 16. The cumulative sinusoidal functions to be individually applied to the plates are obtained by combining the lateral and angular displacement corrections for pattern coincidence error $\Delta E_H$, $\Delta E_V$, $\Delta \theta_H$, and $\Delta \theta_V$, with the desired horizontal and vertical angular pattern coincidence orientation angles $\theta_H$ and $\theta_V$, respectively, and the desired horizontal and vertical lateral pattern coincidence orientation potentials, $E_H$ and $E_V$, respectively, In a deflection plate system, such as the one illustrated in FIGS. 1A through 1E, where four deflection plates 17, composed of two opposite pairs of deflection plates, the potential on the opposite member of each pair being the negative of the potential on the other member, the potentials to be applied to the deflection plates 17 in order to correct for lateral and angular displacement are of the form:

$$E_1 = (E_H + \Delta E_H) \cos(\theta_V + \Delta \theta_V) + (E_V + \Delta E_V) \sin(\theta_H + \Delta \theta_H)$$
$$E_2 = (E_H + \Delta E_H) \sin(\theta_V + \Delta \theta_V) - (E_V + \Delta E_V) \cos(\theta_H + \Delta \theta_H)$$
$$E_3 = -(E_H + \Delta E_H) \cos(\theta_V + \Delta \theta_V) - (E_V + \Delta E_V) \sin(\theta_H + \Delta \theta_H)$$
$$E_4 = -(E_H + \Delta E_H) \sin(\theta_V + \Delta \theta_V) + (E_V + \Delta E_V) \cos(\theta_H + \Delta \theta_H)$$

where $E_1 = -|E_3|$, $|E_2| = |-|E_4|$.

These expressions represent the general equations for correcting for lateral and angular displacement when both exist, whether the angular displacement is due to skew or rotational misalignment. These cumulative sinusoidal correction signals are then processed and fed to a memory device where they are maintained while the corrected beam executes a subsequent sweep to verify the accuracy of the correction. If another error signal that exceeds some preset threshold is obtained, such as when, for example, the desired on-axis condition threshold for lateral displacement is the lateral summation being equal to 0, and the desired on-axis condition threshold for the angular displacement is the angular subtraction resultant being equal to 0, the process is repeated. This repetition occurs until the on-axis conditions are met. When the correction is within acceptable tolerances, in accordance with the on-axis conditions, it is held in memory and applied to the beam in order to maintain scan-surface pattern coincidence until a subsequent adjustment may be required.

The scan-surface pattern coincidence may be verified periodically be repeating the process previously enumerated. This would allow for correction of misalignment resulting from "drift" in the associated electronics, as well as misalignment due to other factors such as mechanical movement or thermal vibrations.

The method of the present invention can be mathematically described by reference to the example shown in FIGS. 1A through 1E. If we assume the presence of merely rotational misalignment, such as shown in FIG. 1A, and let $E_1 = EH$, $E_2 = -E_V$, $E_3 = -E_H$ and $E_4 = E_V$, the expressions for correcting for vertical skew of the scan pattern 15 only are $E_1 = EH\cos(\theta_V + \Delta \theta_V)$, $E_2 = E_H \sin(\theta_V + \Delta \theta_V) - E_V$, $E_3 = -E_H \cos(\theta_V + \Delta \theta ahV)$ and $E_4 = -E_H \sin(\theta_V + \Delta \theta ahV) + E_V$. The result is shown in FIG. 1B where vertical skew has been compensated for and only horizontal skew exists.

The condition shown in FIG. 1C, where only vertical skew exists and horizontal skew has been corrected for, may be represented by the expressions $E_1 = E_V \sin(\theta_H + aF\theta_H) + E_H$, $E_2 = -E_V\cos(\theta + \Delta\theta a[H])$, $E_3 = -E_V\sin(\theta_H + \Delta\theta a[H]) - E_H$, and $E_4 = E_V\cos(\theta_H + b\,F\theta_H)$.

The alignment condition depicted in FIG. 1E, when both vertical and horizontal skew have been corrected for, and no lateral displacement exists, can be represented by the expressions 
$E_1 = E_H\cos(\theta_V + a8F\theta_V) + E_V\sin(\theta + \Delta\theta a[H])$,
$E_2 = E_H\sin(\theta_V + aq\,F\theta_V) - E_V\cos(\pi\mathcal{V}_H + \Delta\theta a[H])$,
$E_3 = -E_H\cos(\theta_V + \Delta\theta ahV) - EV\sin(\theta_H + \Delta\theta_H)$, and
$E_4 = -E_H\sin(\theta_V + \Delta\theta ahV) + E_V\cos(\theta_H + bF\theta_H)$.

In the situation where the vertical angular displacement correction $\Delta\theta_V$ is equal to the horizontal angular displacement correction $\Delta\theta_H$, this double skew correction will be equivalent to rotational correction.

In the condition shown in FIG. 1D where only lateral displacement now exists, both horizontal and vertical skew having been compensated for, we simply add the horizontal lateral displacement correction $\Delta E_H$ to the lateral orientation potential $E_H$, and the vertical displacement correction $\Delta E_V$ to the vertical lateral orientation potential $E_V$, to obtain the expressions $$E_1 = (E_H + \Delta E_H)\cos\theta_V + (E_V + \Delta E_V)\sin\theta_H$$
$$E_2 = (E_H + \Delta E_H)\sin\theta_V - (E_V + \Delta E_V)\cos\theta_H$$
$$E_3 = -(E_H + \Delta E_H)\cos\theta_V - (E_V + \Delta E_V)\sin\theta_H$$
$$E_4 = -(E_H + \Delta E_H)\sin\theta_V + (E_V + \Delta E_V)\cos\theta_H.$$

For small angular displacement corrections, where $\Delta\theta$ is approximately 1° which is actually the situation in several instances where fairly reliable equipment is utilized, the sine and cosine functions of the general expression could be approximated by linear functions with slopes equal to those of lines tangent to the sine and cosine functions at the chosen angle $\theta$ and the general expression would reduce to the linear form $$E_1 = (E_H + \Delta E_H)[\cos\theta_V - (\sin\theta_V)\Delta\theta_V] + (E_V + \Delta E_V)[\sin\theta_H + (\cos\theta_H)\Delta\theta_H];$$
$$E_2 = (E_H + \Delta E_H)[\sin\theta_V + (\cos\theta_V)\Delta\theta_V] - (E_V + \Delta E_V)[\cos\theta_H - (\sin\theta_H)\Delta\theta_H];$$
$$E_3 = -(E_H + \Delta E_H)[\cos\theta_V - (\sin\theta_V)\Delta\theta_V] - (E_V + \Delta E_V)[\sin\theta_H + (\cos\theta_H)\Delta\theta_H]; \text{ and}$$
$$E_4 = -(E_H + \Delta E_H)[\sin\theta_V + (\cos\theta_V)\Delta\theta_V] + (E_V + \Delta E_V)[\cos\theta_H - (\sin\theta_H)\Delta\theta_H];$$

where $\theta$ and $\Delta\theta$ are both in radians.

If the desired angular orientation angles, $\theta_V$ and $\theta_H$, are chosen to be 45°, a system performing the method of the present invention would have a much lesser degree of error, where a linear approximation of the cumulative sinusoidal function was applied to the plates. This is so because at an angle of 45° the value of the cosine is equal to the value of the sine, the only difference being in slope, the cosine having a negative slope, and the sine having a positive slope. Thus, the error determined by approximating these sinusoidal functions by a linear slope is identical. This is not so where angles other than 45° are utilized because the error range for the sine is small for small angles, while the error range for the cosine function is small for larger angles, therefore, producing a high degree of error for one of the linearly approximated functions, when the cosine function and sine function values are not equal. If a linear approximation is not valid, such as in the general case where large angular displacements are anticipated as being necessary to achieve coincidence, this restriction does not apply.

A modification to the proposed method of the present invention could provide that during the time that vertical skew correction is being accomplished, on the basis of an x-axis-horizontal scan, the same correction could be automatically applied to the horizontal skew, thereby giving a rotation correction; and, when the surface pattern sweep becomes vertical, along the y-axis, the resulting horizontal skew correction is not also applied to the vertical skew, thereby resulting in a skew correction of the beam trace instead of a rotation correction as before.

OPERATION

An apparatus by which the method of the present invention may be performed is shown in FIGS. 4, 5, 6 and 7 when assembled as shown in FIG. 8. This apparatus represents a digital apparatus for use in conjunction with an electron beam addressed memory system utilized with a computer 42. In such a system, alignment of the scan pattern 15 with the surface pattern 16 is essential as the tolerances which are necessary for the proper readout of information, from electron beam addressed memory plane, are critical storage locations in such a system being less than 1 micron in size. This digital apparatus, by performing the method of the present invention will have a submicron applicability and be able to align the scan pattern 15 and surface pattern 16 to make them coincident within the necessary tolerances for such a system.

The misalignment in an electron beam addressed memory system could result from a mechanical movement of a memory plane into position to be read at the request of the central computer 42, much in the same way a drum or data cell drive is searched by a computer. After the computer 42 calls for the new memory plane, and it is placed into position, the alignment circuitry assumes control of the electron beam until coincidence is achieved and verified. At that time the control of the electron beam is returned to the computer 42.

In a system of this type, the beam is swept along the x-axis, across the incremental alignment patterns 37, 39. Detectors 43 sort the output signals according to frequency, into the various registers with numbers which will rotate the next sweep clockwise or counterclockwise, and up or down as necessary. After a minimal number of sweeps, the number being dependent upon the degree of tolerable error, such as 12 such sweeps for a 10 percent error, the sweep should be aligned with the plane within the desired accuracy, assuming the alignment pattern 18 shown in FIG. 3A is utilized.

Although the controls for the y-axis sweep signal have undergone rotational correction with the x signal controls, in accordance with the modification previously suggested, the y signals may not necessarily be properly aligned due to skew, as well as left-or-right lateral error. Therefore, the beam is then swept along the y-axis, across the incremental alignment patterns 36, 38. The same detectors 43 sort the output signals according to frequency and add an additional correction to the registers. At this time, both x and y control registers have the proper correction to make the beam coincide with the storage locations on the memory plane. Control of the beam is then passed on to the central computer 42 which will send the beam to the storage bits desired for operation. When the central computer 42 calls for a new memory plane, control is given back to the electron beam system, the registers are reset to zero, or some other starting point, a new plane is placed into position, by mechanical means, for example, and the electronic alignment-correcting sequence of the present invention is repeated.

When a new memory plane is placed beneath the electron beam by some mechanical means, it will be aligned with the beam only to within some accuracy that is a function of the mechanism used, and the time allotted to such positioning; therefore, the method of the present invention may be utilized to correct for the lateral and angular misalignment occurring. The incremental alignment patterns 36, 37, 38, 39 located on the memory plane, such as in the positions indicated in FIG. 2, must be large enough to insure that the beam will impinge upon these patterns 36, 37, 38, 39 even when the mechanical positioning error is combined to present a worst-case misalignment condition.

The beam is instructed to execute an x-axis horizontal sweep $VA_x$ to check for vertical alignment. The output signal, which can be due to, for example, secondary electron emission, back-scattered primary electrons, absorbed beam current, or photons, is picked up by a sensor, such as an electron multiplier, located above the surface 20, and transmitted to the alignment correcting circuitry which performs in accordance with the method of the present invention. This output signal will be composed of one or more frequencies, generated by the constant motion of the beam sweeping over portions of the incremental alignment pattern segments 36, 37, 38, 39, such as the portions of a pattern 18, such as that shown in FIG. 3A. As was previously mentioned, the beam sweeps across the incremental segments of the alignment patterns 36, 37, 38, 39 during two time periods, $t_A$, and $t_B$, during which time it is incident upon the two alignment pattern 18 areas A and B lying on one of the axes of the plane. Where an electron beam addressed memory plane is used, the beam could be turned off while passing across the intervening areas so as to prevent inadvertent alteration of the stored data, and for purposes of illustration, this condition will be assumed.

The main computer 42 in such a system could initiate the electronic alignment in at least one of two ways. It could call for a new storage plane represented by the instruction CPU–NP, whereupon a new plane would replace the old one beneath the electron beam by some mechanical means. Upon completion of this instruction, represented by the symbol MA, electronic alignment will automatically begin, in accordance with the method of the present invention. In addition, the main computer 42 could call for a verification of the alignment of the existing plane, represented by the instruction CPU–EA, whereupon electronic alignment would begin in accordance with the method of the present invention. At the completion of alignment, when the scan and surface patterns 15, 16 are coincident, the circuit provides a signal, represented by the instruction CPU–R, instructing the main computer 42 to assume control of the electron beam again. The computer 42, during its use of the storage plane, would control the electron beam by stipulating the x and y addresses represented as $E_H$ and $E_V$, and provide a signal, represented as the instruction CPU–RA, to cause these numbers to be adjusted in accordance with the correction values being held in the hold registers 46, 47, 48, 49, 50 and 51.

The error-determination circuitry shown in block diagram form in FIGS. 5A and 5B, will separate the various frequencies obtained by means of resonant detectors 43–43, at the input. All stimulated detectors 43–43 will trigger a pulse $\tau_P$ from a monostable multivibrator 54–54 in their respective channels 55–55. A series of off gates 56–56 shown in more detail in FIG. 10, are controlled by these pulses so that in the event of more than one frequency being present, the frequency closest to the desired frequency $f_1$ will be allowed to continue through the circuitry.

The operation of the off gates 56–56 which controls this, shown in more detail in FIG. 10, is as follows. When a signal B is input to the off gate 56 through a conductor 58, and a second signal A is also input to the off gate 56, through another conductor 59, signals A and B are fed to an OR gate 60, whose output is in turn fed to an AND gate 61 via a single conductor 62. The AND gate 61 simultaneously receives the logical inverse of signal A is also passed through a logical inversion gate 66; the two inputs to the AND gate 61, via their associated conductors 62, 65, and the inputs to the OR gate 60, via their associated conductors 58, 59, being logically combined in accordance with the logic expression $$C=[(A+B)\cdot \overline{A}]$$

to obtain signal C which is output via a conductor 67. The logical combination is as follows: If A is not present, output C would be identical to input B; if A is present, there would be no output. Thus, it can be seen that since the $\tau_P$ channels 55–55 are logically represented by signal B, and the channel connectors 68–68 are logically represented as signal A for this discussion, if a signal is present on a channel connector 68, there would be no output signal from the off gate 56 associated with this channel connector 68.

In the event that $f_1+$ and $f_1-$ are both present, neither is allowed to pass, but rather a special signal, via its associated path 86, is sent to the on axis indication circuitry, shown in FIG. 7, indicating that the beam is on axis, at least for the first incremental or second incremental portion of the sweep.

If $f_1+$ and $f_1-$ are not both present, the pulse $\tau_P$ allowed to pass through, is again gated by $\tau_A$, via its associated path 71, through an AND gate 72–72, if this condition occurs during the sweep interval $t_A$, or pulse $\tau_B$, via its associated path 73, through an AND gate 74–74, if this condition occurs during the sweep interval $t_B$. Pulses passed via their associated paths 75–75 during the time $\tau_A$ is present admit associated fixed constants, from associated fixed constant registers 79–79, to the increment registers 76, 77 first; those pulses passed, via their associated paths 78–78, while $\tau_B$ is present admit these associated fixed constants to these registers 76, 77 subsequently. Pulses arising from *f+* inputs, that is, indicating that the beam is on the positive side of the storage plane axis, admit negative values to the increment registers 76, 77.

After the signals resulting from the beam striking particular portions of the incremental alignment patterns 36, 37, 38, 39 during the sweep interval periods $t_A$ and $t_B$ have been obtained, they are combined before being fed to the increment registers 76, 77, the previously obtained $t_A$ values in the registers 76, 77 being combined with the $t_B$ values before admitting these combined values to the registers 76, 77, in one of two mathematical ways, in accordance with the method of the present invention; for lateral error determination, signals occurring while $\tau_A$ and $\tau_B$ were present, were added together; for angular error determination, the difference of the signals present during these two intervals was obtained. To obtain a correction signal proportional to the amount of misalignment, the various pulses $\tau_P$ admit fixed constants from the associated fixed constant registers 79–79 to the increment registers 76, 77, that correspond in magnitude with the distance of the beam from the axis, in accordance with the method of the present invention, when the alignment pattern 18 shown in FIG. 3A is utilized.

Since these increment registers 76, 77 are reset to zero, via pulse $\tau_S$, via its associated path 81, before each alignment pattern sweep, the information they contain is transferred to hold registers 46 through 51, which accumulate all the correction increments required for alignment. For vertical alignment, information is transferred during occurrence of the $\tau_{SV}$ pulse, via its associated path 82, for horizontal alignment, this information transfer occurs during the occurrence of the $\tau_{SH}$ pulse, via its associated path 83. Hold registers 46 through 51 maintain the correction data during the time the new plane is being used by the computer 42. Upon introduction of another plane, these hold registers 46 through 51 are reset to zero, or some other value in the case of the rotation hold registers 47, 48, 50 and 51, due to the occurrence of the $\tau_Z$ pulse, via its associated path 84.

In order to accomplish rotation of an orthogonal x–y scanning pattern within a system of orthogonal deflection plates 17, it is necessary that the x–y deflection voltages be attenuated in amounts corresponding to the sine and cosine functions of the rotation angle; however, for the range of angles anticipated, in a system of this type, these trigonometric functions could be approximated by linear functions with appropriate slopes and still achieve accuracy for within acceptable ranges, as previously discussed. If a given design, or employment, requires rotation in excess of that in which the linear function properly approximates the trigonometric function, the trigonometric function can be simulated by several linear functions with differing slopes. Data regarding the proper slope to be used at any one time could be stored in a small auxiliary memory in such a system.

When the beam is on axis during the sweep interval $t_A$, a signal, via its associated path 86, is sent to the on axis indication circuitry, shown in FIG. 7, where it is passed by an AND gate 85, due to the occurrence of the $\tau_A$ pulse, the gate 85 in turn triggering a $\tau_{T1}$ pulse, via its associated path 87, which lasts through sweep interval $t_B$. If the beam is not on axis during the sweep interval $t_B$ as well, no output signal is obtained. If, however, the beam is on axis during both periods, the on-axis signal is passed by an AND gate 88, due to the occurrence of the $\tau_B$ pulse the gate 88 in turn triggering a $\tau_{T2}$ pulse via its associated path 91, which also lasts through the sweep interval $t_B$, both $\tau_{T1}$ and $\tau_{T2}$ being present during $t_B$. A vertical alignment signal, via its associated path 89, represented as VA, is then obtained due to the occurrence of the $\tau_{SV}$ pulse, in the case of vertical alignment during the horizontal sweep, the VA signal passing through a delay line 98 to insure $\tau_{SV}$ is off before vertical sweeping begins. The occurrence of this VA signal causes vertical sweeping on the y-axis to begin. At the completion of horizontal alignment, horizontal alignment signal, represented by HA via its associated path 90, is obtained which returns control of the electron beam to the computer 42.

Figure 6:
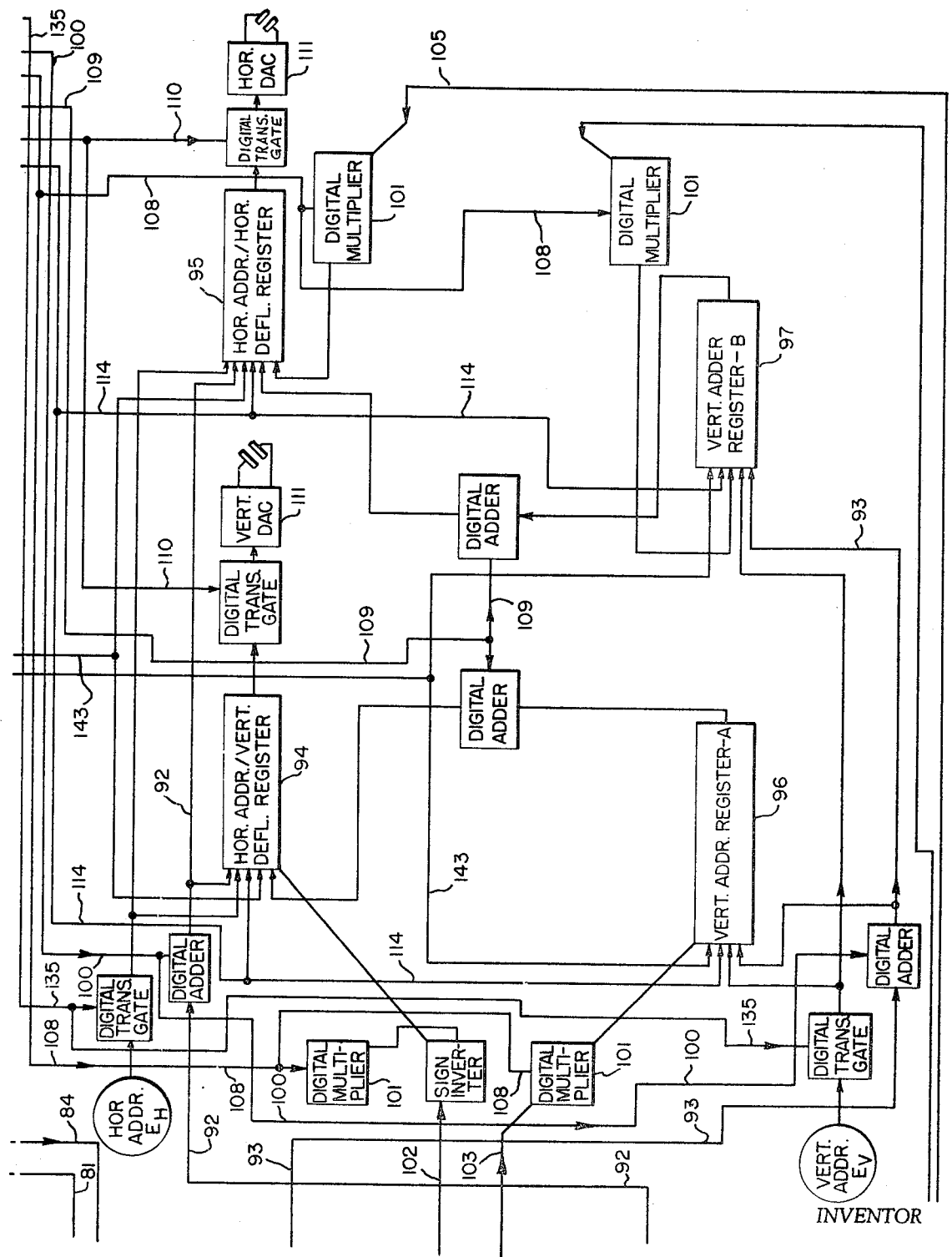

The error correction circuitry, shown in FIG. 6, adds the lateral horizontal hold, via its associated path 92, and lateral vertical hold information, via its associated path 93, into four registers 94 through 97 during the occurrence of the $\tau_E$ pulse, via its associated path 100. These values are then multiplied, in digital multipliers 101, by the appropriate rotation vertical hold, via associated paths 102, 103, and rotation horizontal hold values, via associated paths 104, 105, indicative of angular displacement, with the products being put in the same four registers 94, 95, 96, 97 during the occurrence of the $\tau_F$ pulse, via its associated path 108. The values in the vertical address registers 96, 97 are added to those in the deflection registers 94, 95, the sum being put in the deflection registers 94, 95 during the occurrence of the $\tau_G$ pulse, via its associated path 109. These values, representing the correction values obtained at the completion of this sweep, are then transferred, during occurrence of the $\tau_H$ pulse, via its associated path 110, to the digital to analogue converters 111 to correct the electron beam. A $\tau$ I reset pulse, via its associated path 114, returns all four registers 94 through 97 to their null states in readiness for the next correction.

The alignment control circuitry, shown in FIG. 4, receives the instruction signals from the main computer 42 along with the control signals from the main computer 42 along with the control signals from the error correction, error determination, and on-axis indication circuitry, and generates the timing signals that control the electronic alignment procedure. FIGS. 9A, 9B, 9C and 9D show the timing relationship of the various pulses throughout the electronic alignment procedure; FIG. 9A showing the relationship during electronic alignment for each sweep $\tau_{SV}$ and VA being present only during the horizontal sweep $VA_s$ to obtain vertical lateral and angular alignment; $\tau_{SH}$ and HA being present only during the vertical sweep $HA_s$ to obtain horizontal lateral and angular alignment; FIG. 9B showing the relationship when alignment is complete and coincidence exists; FIG. 9C showing the relationship for beam accessing and operation after alignment; and FIG. 9D showing the relationship when a new plane is called for.

The computer 42 instruction for an alignment verification, CPU–EA, or a new plane, CPU–NP, causes a bistable multivibrator 115 to output a continuous signal on the alignment process line 116, a second bistable multivibrator 117 to output a continuous signal on the vertical alignment line 120, and starts a clock 121. The clock 121 first outputs a pulse, via its associated path 122, which passes through the upper AND gate 123 of the two upper gates 123, 124 and initiates a horizontal sweep $VA_s$ from a horizontal sweep generator 125. It then provides the $\tau_A$ pulse during the sweep interval $t_A$, and the $\tau_B$ pulse during the sweep interval $t_B$. After this, another clock pulse, via its associated path 126, is passed by the upper AND gate 128 of the two lower gates 128, 129 to provide the $\tau_{SV}$ pulse.

If vertical alignment has not been achieved, and no vertical alignment pulse VA results from the on-axis circuitry, the $\tau_{SV}$ pulse is passed to a gate 130 to initiate the $\tau_S$ pulse. A second delay line 134, which may have the same delay as the previous delay line 98, insures that the $\tau_S$ pulse occurs after $\tau_{SV}$ as shown in the timing signal chart, FIG. 9A, for the horizontal and vertical sweep conditions. The first pulse output, the $\tau_D$ pulse, via its associated path 135 of a second clock 131 is not passed, since the first multivibrator 115 is holding it off by control of an off gate 136; however, the $\tau_C$ pulse output, via its associated path 139 is passed to an AND gate 140, which, with the first multivibrator 115 in the "alignment procedure" state, passes the $\tau_C$ pulse to the digital transfer gates 141, 142 associated with the sweep generators 125, 138, where, since the circuit is in the horizontal sweep condition, the horizontal sweep signal is passed, via its associated digital transfer gate 141, via its associated path 143, to the horizontal address registers 94, 95. During each sweep, the second clock 131 is restarted a plurality of times due to the occurrence of the digital sweep signal, only one successive clock output being shown in FIGS. 9A and 9B for purposes of clarity.

The $\tau_E$, $\tau_F$, $\tau_G$ and $\tau_H$ pulses occur in succession when the second clock 131 is started. Finally, the $\tau_I$ pulse is output, and fed to the registers 94, 95, 96, 97. The $\tau_S$ pulse is passed to an AND gate 127, and with the first multivibrator 115 in the "alignment procedure" state, the $\tau_S$ pulse is fed back to the input of the first clock 121 to begin a new sweep.

When vertical alignment is complete, the VA vertical alignment signal prevents the $\tau_S$ pulse from starting, switches the second multivibrator 117 to the "horizontal alignment" state, outputting a continuous signal on the horizontal alignment line 137, and triggers the first clock 121. The above process is then repeated with the exception of the horizontal sweep $VA_s$ being replaced by vertical sweep $HA_s$, from a vertical sweep generator 138, through the associated gate 124, and the generation of the $\tau_{SH}$ pulse instead of the $\tau_{SV}$ pulse through the associated gate 129. The horizontal alignment is repeated until the beam is horizontally aligned, whereupon an HA horizontal alignment signal is produced and returns the first multivibrator 115 to its normal state, and returns control of the beam to the main computer 42 via signal CPU-R.

During normal operation of the computer 42, signal CPU-RA will trigger the second clock 131, which would then output the $\tau_D$, $\tau_E$, $\tau_F$, $\tau_G$ $\tau_H$, and $\tau_I$ pulses to control the correction processing the storage location addresses. Since the first multivibrator 115 is in the CPU-R, "aligned" state, the $\tau_D$ pulse is passed through the associated gate 136.

By performing the method of the present invention, overall alignment of a scan pattern with respect to a surface pattern may be accomplished at one time, resulting in increased efficiency in memory readout time, in the case of electron beam addressed memories, since the beam is not servo corrected at every point. Other advantages for electron beam addressed memory type systems are that the center storage location on a surface can be positioned beneath the zero deflected electron beam; the beam addressing patterns can be shifted along both the $x$ and $y$ axis of the surface; both rotational and skew misalignment, as well as lateral misalignment of the scan pattern with respect to the surface pattern can be compensated for and corrected; it is applicable in submicron environments; and there is a minimum change in electron-optical parameters during the alignment process.

There is no restriction on the type of alignment pattern to be employed in performing the method of the present invention, such as the number of bands being required, or having bands with widths that are proportional to their distance from the axes and generate correction voltages equal to the widths, as is shown in FIG. 3A, or having widths that are equal to each other and generate correction voltages proportional to their distance from the axes, or a combination of both. There is also no restriction on the type of circuitry that could be utilized to perform the method of the present invention, analogue as well as digital, and combinations of the two being capable of performing the method of the present invention. As was previously mentioned, the method of the present invention could be applied to any deflectable beam, such as a laser beam with its associated deflection means.

It is to be understood that the above described embodiment of the invention is merely illustrative of the principles thereof and numerous modifications and embodiments of the invention may be derived within the spirit and scope thereof, such as pulse sweeping a gross-alignment alignment pattern in order to achieve large scale corrections, and then sweeping a fine-alignment alignment pattern to achieve vernier pattern coincidence correction.

I claim:

1. A method of aligning a scan pattern with a surface pattern comprising:
   forming a scan pattern, including sweeping a deflectable beam at a predetermined rate across at least two incremental segments of the surface pattern to form a two-dimensional scan pattern in order to obtain pattern coincidence error recognition information; and
   correcting for lateral and angular displacement of the scan pattern with respect to the surface pattern so as to make the scan pattern coincident with the surface pattern, including the step of obtaining an output signal from the surface pattern sweep, the output signal being a function of the location and angular orientation of the path of the sweep, and further including the step of applying driving signals to a deflection means, the driving signals varying in accordance with the pattern coincidence error recognition information obtained from the beam sweep of the surface pattern so as to deflect the beam and correct for the lateral and angular displacement.

2. A method in accordance with claim 1 wherein the step of obtaining an output signal from the surface-pattern sweep includes the still further step of obtaining an output signal from each segment swept comprising at least one frequency as a function of the location and angular orientation of the path of the sweep, the frequency of the output signal providing information on the direction and magnitude of lateral correction to be applied to the set of deflection plates to produce lateral coincidence of the scan and surface patterns.

3. A method in accordance with claim 2 wherein the step of obtaining an output signal from the surface pattern sweep includes the still further step of obtaining an output signal from the incremental segments sweep, the difference in frequencies between segments providing information on the direction and magnitude of angular correction to be applied to the set of deflection plates to produce angular coincidence of the scan and surface patterns.

4. A method in accordance with claim 3 wherein:
   the step of sweeping the beam includes the still further step of sweeping the beam repetitively across an alignment pattern portion of the surface pattern until the desired lateral and angular pattern coincidence is achieved; and
   the step of obtaining an output signal from the surface pattern sweep includes the still further step of storing the pattern coincidence error recognition information until the completion of each sweep.

5. A method in accordance with claim 4 wherein the step of applying driving signals to a deflection means includes the further step of applying the driving signals to a set of deflection means from storage after the completion of each sweep until the desired lateral and angular pattern coincidence is achieved.

6. A method in accordance with claim 5 wherein the step of storing the pattern coincidence error recognition information until the completion of each sweep includes the further step of storing the pattern coincidence error recognition information after the desired lateral and angular pattern coincidence is achieved, in order to be able to maintain pattern coincidence when the desired pattern coincidence orientation is varied.

7. A method in accordance with claim 5 wherein the step of applying driving signals to a set of deflection means includes the still further step of applying driving signals which are a cumulative sinusoidal function of the lateral and angular displacement.

8. A method in accordance with claim 7 wherein:
   the step of correcting for lateral and angular displacement includes the still further steps of sweeping a first alignment pattern portion of the surface pattern in a first direction to obtain a vertical lateral and angular pattern coincidence error recognition information;
   sweeping a second alignment pattern portion of the surface pattern in a second direction, the second direction being normal to the first direction, to obtain horizontal lateral and angular pattern coincidence error recognition information;
   storing both the vertical and horizontal pattern coincidence error recognition information until both directional sweeps have been completed; and combining the vertical and horizontal pattern coincidence error recognition information to obtain the cumulative sinusoidal function to be applied to the set of defection means.

9. A method in accordance with claim 8 wherein the step of applying driving signals to a set of deflection means, the driving signals being a cumulative sinusoidal function of the lateral and angular displacement; includes the still further step of applying driving signals to a set of opposite pairs of deflection means, the signals being of the form:

$$E_1 = (E_H + \Delta E_H) \cos(\theta_V + \Delta \theta_V) + (E_V + \Delta E_V) \sin(\theta_H + \Delta \theta_H)$$

$$E_2 = (E_H + \Delta E_H) \sin(\theta_V + \Delta \theta_V) - (E_V + \Delta E_V) \cos(\theta_H + \Delta \theta_H)$$

$$E_3 = -(E_H + \Delta E_H) \cos(\theta_V + \Delta \theta_V) - (E_V + \Delta E_V) \sin(\theta_H + \Delta \theta_H)$$

$$E_4 = -(E_H + \Delta E_H) \sin(\theta_V + \Delta \theta_V) + (E_V + \Delta E_V) \cos(\theta_H + \Delta \theta_H)$$

where $E_1$ and $E_3$ are the potentials applied, respectively, to one pair of deflection means; $E_2$ and $E_4$ are the potentials applied, respectively, to the other pair of the deflection means, $\theta_H$ and $\theta_V$ are the desired horizontal and vertical angular pattern coincidence orientation angles, respectively; $E_H$ and $E_V$ are the desired horizontal and vertical lateral patten pattern coincidence orientation potentials, respectively; $\Delta E_H$ and $\Delta E_V$ are the horizontal and vertical lateral displacement corrections for pattern coincidence error, respectively; and $\Delta \theta_H$ and $\Delta \theta_V$ are the horizontal and vertical angular displacement corrections for pattern coincidence error, respectively.

10. A method in accordance with claim 9 wherein:
the step of correcting for lateral and angular displacement includes the still further step of periodically verifying the pattern coincidence by sweeping the alignment pattern portions of the surface pattern at desired intervals; and repetitively correcting for lateral and angular pattern coincidence error when the periodic surface pattern sweep does not verify coincidence.

11. A method in accordance with claim 9 wherein the step of obtaining an output signal from each segment swept comprising at least one frequency as a function of the location and angular orientation of the path of the sweep includes the still further step of providing information from the output signal on the lateral displacement correction to be applied to the deflection means in the form of an electrical potential, each frequency obtained having an electrical potential associated with the frequency.

12. A method in accordance with claim 11 wherein the step of obtaining an output signal from the incremental segments sweep includes the still further step of providing information on the angular displacement correction to be applied to the deflection means in the form of an electrical potential, each frequency obtained having an electrical potential, associated with the obtained frequency, the associated electrical potentials being the same for providing both lateral and angular pattern coincidence error recognition information, a different associated potential for each frequency, the associated potentials being integral multiples of each other.

13. A method in accordance with claim 12 wherein:
the step of providing information on the lateral displacement correction to be applied to the deflection means in the form of an electrical potential includes the still further steps of summing the potentials indicating lateral position of the sweep during each incremental segment sweep;
storing the summation until the angular displacement correction information is obtained; and
combining the lateral displacement correction summation information with the angular displacement correction information and the desired angular and lateral pattern coincidence orientation information to obtain the cumulative sinusoidal functions of the driving signals for each sweep, until the desired lateral and angular coincidence is obtained.

14. A method in accordance with claim 13 wherein:
the step of providing information on the angular displacement correction to be applied to the deflection means from the difference in frequencies between the segments includes the still further steps of subtracting the potentials indicating angular orientation of the sweep in subsequent incremental segments from the potential indicating angular pattern coincidence error of the sweep in the first segment swept;
storing the subtraction resultant angular displacement correction information until the lateral displacement correction information is obtained; and
combining the angular displacement correction subtraction resultant with the lateral displacement correction summation information and the desired angular and lateral pattern coincidence orientation information to obtain the cumulative sinusoidal functions of the driving signals for each sweep until the desired lateral and angular coincidence is obtained.

15. A method in accordance with claim 14 wherein:
the step of sweeping the beam repetitively across the alignment pattern portion of the surface pattern until the desired lateral and angular pattern coincidence is achieved includes the still further step of sweeping the alignment pattern portion of the surface pattern successively after the cumulative sinusoidal function of the lateral and angular displacement for the previous sweep has been obtained and applied to the deflection means, until the desired lateral and angular pattern coincidence is achieved; and
the step of combining the lateral displacement correction summation information with the angular displacement correction information and the desired angular and lateral pattern coincidence orientation information for each sweep includes the further steps of accumulating the lateral displacement correction summations after each successive sweep until the desired pattern coincidence is achieved, the lateral displacement correction summation obtained during each successive sweep being added to the previously obtained lateral correction summations to obtain a new lateral correction summation, the new lateral correction summation being the sum of all previously obtained lateral correction summations, and replacing the previous lateral correction summation in storage with the new lateral correction summation until the desired lateral and angular pattern coincidence is achieved.

16. A method in accordance with claim 15 wherein:
the step of combining the lateral displacement correction information with the angular displacement correction information and the desired angular and lateral pattern coincidence orientation information for each sweep includes the further steps of accumulating the angular displacement correction subtraction resultants after each successive sweep until the desired pattern coincidence is achieved to obtain a summation of the subtraction resultants, the subtraction resultants obtained during each successive sweep being added to the previously obtained subtraction resultant summation, the new subtraction resultant summation being the sum of all previously obtained subtraction resultant summations; and
replacing the previous subtraction resultant summation in storage with the new subtraction resultant summation until the desired lateral and angular pattern coincidence is achieved.

UNITED STATES PATENT OFFICE
CERTIFICATE OF CORRECTION

Patent No. 3,551,730     Dated December 29, 1970

Inventor(s) Brian Keith Conrad

It is certified that error appears in the above-identified patent and that said Letters Patent are hereby corrected as shown below:

In the specification, column 3, line 59, insert --utilized.-- between "is" and "More"

In the specification, column 4, line 67, insert --second segment sweep of the beam during the-- between "the" and "time"

In the specification, column 5, line 28, the formula should appear as follows:

$$\text{where } |E_1|=-|E_3|, \quad |E_2|=-|E_4|$$

line 60, the formula should appear as follows:

$$E_3 = -E_H \cos(\theta_V + \Delta\theta_V)$$

lines 60 and 61, the formula should appear as follows:

$$E_4 = -E_H \sin(\theta_V + \Delta\theta_V) + E_V$$

UNITED STATES PATENT OFFICE
CERTIFICATE OF CORRECTION

Patent No. 3,551,730          Dated December 29, 1970

Inventor(s) Brian Keith Conrad

It is certified that error appears in the above-identified patent and that said Letters Patent are hereby corrected as shown below:

In the specification, column 8, line 47, insert --via another single conductor 65, after signal A-- between "A" and "is"

In the claims, column 13, line 27, delete the word "patten".

Signed and sealed this 11th day of May 1971.

(SEAL)
Attest:

EDWARD M. FLETCHER, JR.
Attesting Officer

WILLIAM E. SCHUYLER,
Commissioner of Paten